UNITED STATES PATENT OFFICE.

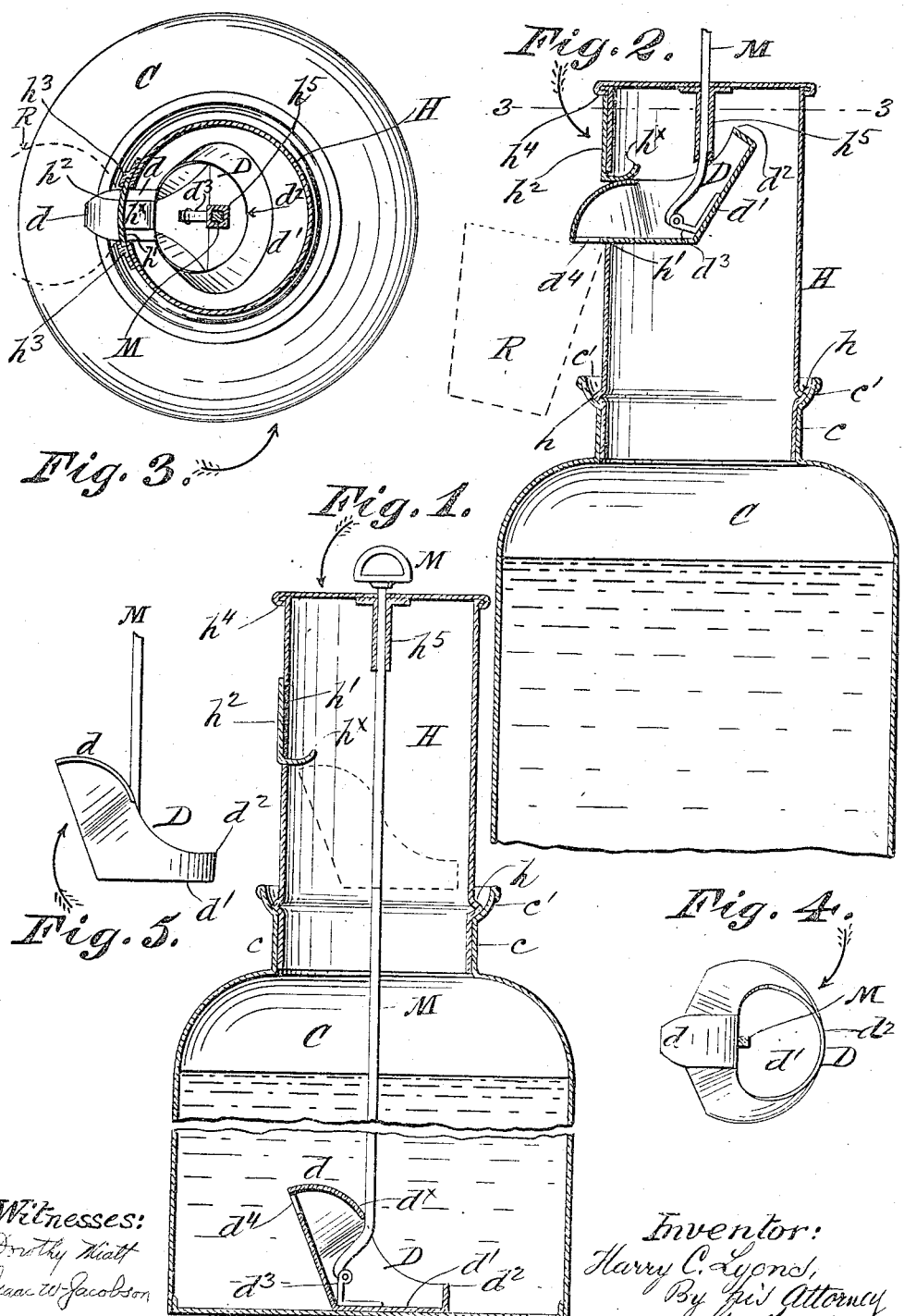

HARRY C. LYONS, OF NEW YORK, N. Y.

LIQUID-DISPENSING MEANS.

1,288,629.

Specification of Letters Patent. Patented Dec. 24, 1918.

Application filed April 26, 1918. Serial No. 230,889.

*To all whom it may concern:*

Be it known that I, HARRY C. LYONS, a citizen of the United States, and a resident of the borough of Manhattan, city, county, and State of New York, have invented certain new and useful Improvements in Liquid-Dispensing Means, of which the following is a specification.

My improvements relate to the type of apparatus for dispensing liquids set forth in concurrent application Serial No. 207,669, filed December 18, 1917, of which applicant is sole owner by assignment duly recorded, such apparatus being applicable to the measuring and dispensing of liquids of various kinds, and especially for the dispensing of milk direct from the shipping can in a convenient and sanitary manner, at the same time attaining a proper and requisite proportional admixture of all the liquid constituents so that the milk dispensed is of standard quality.

The object of the present invention is to simplify and cheapen as well as render more safe and effective the dispensing means, and the invention consists in the specific combination and arrangement of parts described and claimed herein, distinctive features being the construction of the dipper, the closure, and the means for operating same, all as hereinafter fully set forth.

In the accompanying drawings,

Figure 1, is a central vertical sectional elevation of a shipper's milk can of standard shape, with my improved measuring and dispensing means applied thereto,—the dipper being in lowest position;

Fig. 2, is a similar section of the upper portion of a shipper's milk can and my dispensing means applied thereto, the dipper being shown in its highest or discharge position;

Fig. 3, is a horizontal section taken upon plane of line 3—3, Fig. 2.

Fig. 4, is a top view of the dipper untilted, or in the position shown in Figs. 1 and 5;

Fig. 5, is a side elevation of the dipper in untripped position.

I herein show and describe my invention as embodied in means for the measuring and dispensing of milk, although, as heretofore intimated, I do not limit myself thereto, since various other liquids may in like manner be so measured and dispensed without departing from the spirit and intention of my invention,—the apparatus being modified but slightly in conformity with the special requirements of the liquid to be dispensed.

With this understanding, C, represents a shipper's milk can of ordinary standard configuration, $c$, being the neck formed with the usual flared mouth rim $c'$,—the neck $c$, being closed during transportation and storage by a flanged cover (not shown) fitting therein and in the mouth rim $c'$, in a manner well known in the art. This regulation cover is removed from the neck of the can C, when it is desired to dispose of the contents thereof, and my dispensing hood H, is then substituted therefor. The hood H, is by preference of cylindrical shape, its lower end fitting snugly within the neck $c$, of the can C, and it being formed with an external flange $h$, which in the present case fits inside the flared mouth rim $c'$, of the can and rests against the upper end of the cylindrical neck portion $c$, of the shipper's can C, as shown in Figs. 1 and 2, thereby sustaining the hood H, upon and in proper alinement with, said can C. The hood H, is formed with a lateral discharge or delivery aperture $h'$, closed normally by a sliding door $h^2$, the vertical edges of which rest in grooves formed between the shell of the hood H, and flange plates $h^3$, adjacent to said discharge opening $h'$, as shown more particularly in Fig. 3. The bottom of the sliding door $h^2$, is formed with an inturned flange or tripping tongue $h^x$, extending substantially at right angles to the door $h^2$. In its normal closed position this tongue $h^x$, and the door rest upon the lower edge or threshold of the door opening $h'$, as shown in Fig. 1, while the upward thrust of the door is limited by a stop $h^4$, consisting in the construction shown in the drawings of the overhanging flange of the top of the hood H.

The dipper D, is pivotally attached to the lower extremity of a manipulating rod M, which latter is angular in cross section, fitting into a correspondingly shaped guide sleeve $h^5$, rigidly attached to the hood H, by which or equivalent means the manipulating rod M, is prevented from turning laterally and is held in alinement while admitting of its being raised or lowered vertically to manipulate the dipper D, such manipulation being automatic however in so far as the operation of the dipper itself is concerned. That is to say the main function of the non-turnable manipulating bar or rod M, is simply to raise and lower the dipper D, and its length is sufficient to allow the dipper D, to descend to the bottom of the milk can C, as shown in solid lines in Fig. 1,—the dotted lines in said figure illustrating the position of the dipper D, just prior to the contacting of its spout $d$, with the under side of the tripping tongue $h^x$.

The pivotal connection between the lower end of the manipulating rod M, and the dipper D, is so positioned that the rear or bottom portion $d'$, of the dipper acts as a counter-weight to the spout portion $d$, so that gravity tends constantly to hold the dipper in the position shown in Figs. 4 and 5, and in both solid and dotted lines in Fig. 1,—i. e., in a position to act as a cup or retainer for a prescribed quantity of milk, dependent upon the capacity of the dipper below the rear edge $d^2$, thereof. Thus in Figs. 1 and 2, the lower end of the manipulating rod M, which is centrally positioned as related to the hood H, is bent toward the spout side of the dipper for pivotal connection with a lug $d^3$, well beyond the center of gravity of the dipper, considered as a whole. Hence gravity tends constantly to retain the dipper in what may be designated as its normal horizontal position as in Figs. 1, 4 and 5, with the rear edge $d^x$, of the roof of the spout $d$, resting against the manipulating rod M, which is thus utilized as a stop or rest to support the dipper in said horizontal position.

When however the dipper D, is raised sufficiently by the lifting of the rod M, its spout $d$, will contact with the inturned tongue $h^x$, of the door $d^2$. It is shown in dotted lines in Fig. 1, as just about to so contact with the tripping tongue $h^x$, of the door. After such contact between the said parts the continued raising of the manipulating rod M, first cause the dipper D, still in so called horizontal position, to raise the door $h^2$, until the upper edge of the latter contacts with the stop $h^4$, after which the further raising of the dipper causes the tongue $h^x$, to trip or tilt the dipper on its pivotal connection with the rod M, thereby thrusting the spout $d$, through the delivery aperture $h'$, opened for the purpose by the raising of the door $h^2$, as before stated. As a result the milk is discharged through the exit $d^4$, in the front end of the said spout $d$, as will be understood more particularly by reference to Figs. 2 and 3, in which the dotted lines R, indicate a glass or other receptacle positioned to receive the discharge from said dipper D.

The upward thrust and tilt of the dipper D, is limited by its final contact with the lower end of the guide sleeve $h^5$, as shown in Fig. 2, or by any other mechanical expedient that will answer the purpose.

It will be noted that the upper portion of the spout $d$, is inclosed by a curved roof which not only controls the discharge flow but also acts as a cam surface to contact with the tripping tongue $h^x$, and raise the slidable door $h^2$. The latter also performs a double function in that it not only acts normally as a closure to the discharge space $h'$, but also acts to trip or tilt the dipper to empty the same through the exit $d^4$, in the dipper spout $d$.

As compared with the swinging door of the concurrent application hereinbefore referred to, this vertically slidable door has another important advantage and distinction in that it does not obstruct from above a view of the spout $d$, of the dipper when said spout is thrust through the delivery opening $h'$, so that the flow of the liquid may be conveniently observed and the receptacle R, held and manipulated accordingly. This is a great practical advantage in the dispensing of milk and other liquids, being conducive of cleanliness, the avoidance of waste, etc., as well as of convenience.

The holding capacity of the dipper D, is regulated according to requirements so that it may be made to perform the double function of a milk abstracting and measuring device by means of which a prescribed quantity of milk and cream may be dispensed. A third function of the dipper D, and manipulating rod M, is that of an agitator to promote the admixture of the liquid constitutents in the can C. Thus it is well known that the cream and lighter constituents of milk tend to separate from the heavier constitutents of "skimmed milk" and the frequent raising and lowering of the dipper counteracts this tendency, although if the dipper D, is lowered to the bottom of the can after each delivery of milk it is obvious that when again raised for a like purpose it will pass through both the heavier and lighter constituents of the milk and take up an admixture thereof. Nevertheless the use of the manipulating rod M, and dipper D, as a means of agitating and mixing the liquid constituents is advantageous in practice, and being effected by parts entirely inclosed and self contained within the can C, and hood H, such agitation is effected under sanitary conditions and without exposure to the external atmosphere.

The hood H, not only supports the dispensing means but by excluding extraneous air and matter renders the device sanitary in every respect. At the same time the whole contrivance can be quickly and conveniently applied to or detached from a shipping can or other receptacle for milk, and the parts may be readily cleansed and sterilized by scalding or otherwise.

My sanitary apparatus for dispensing "loose" milk from the original package, as it were, is especially suited for use in institutions, hotels, restaurants, groceries, dairies and all situations where large quantities of milk are to be served. Aside from the raising and lowering of the manipulating rod it is entirely automatic in action, and may be operated quickly and conveniently, either continuously or intermittently according to requirements.

What I claim as my invention and desire to secure by Letters Patent is:

1. In liquid dispensing apparatus of the character designated, in combination, a hood adapted to fit over and inclose the entrance to a liquid receptacle and opening thereinto and formed with a lateral delivery aperture, a manipulating rod slidably mounted on and in said hood, a dipper pivotally mounted on the lower portion of said rod, and a closure for said lateral delivery aperture consisting of a slidable door formed with an inturned tripping tongue, whereby the contacting of the spout of the dipper with said tripping tongue will first raise the slidable door and then tilt the dipper to thrust the spout through the lateral delivery aperture, for the purpose described.

2. In liquid dispensing apparatus of the character designated, in combination, a hood adapted to fit over and inclose the entrance to a liquid receptacle and opening thereinto, and formed with a lateral delivery aperture, a manipulating rod slidably mounted on and in said hood, a counterweighted dipper pivotally mounted on the lower portion of said rod and formed with an arched spout cover, and a closure for said lateral delivery aperture consisting of a vertically slidable door formed with an inturned tripping tongue, whereby the contacting of said arched spout cover with said tripping tongue will first raise the slidable door and then tilt the dipper to thrust the spout through said lateral delivery aperture, for the purpose described.

3. In liquid dispensing apparatus of the character designated, in combination, a hood adapted to fit over and inclose the entrance to a liquid receptacle and opening thereinto and formed with an annular flange contacting with the neck within the mouth of the receptacle and also formed with a lateral delivery aperture, a manipulating rod slidably mounted on and in said hood, a dipper pivotally mounted on the lower portion of said rod, and a closure for said lateral delivery aperture consisting of a slidable door formed with an inturned tripping tongue, whereby the contacting of the spout of the dipper with said tripping tongue will first raise the slidable door and then tilt the dipper to thrust the spout through the lateral delivery aperture, for the purpose described.

HARRY C. LYONS.

Witnesses:
  Geo. Wm. Miatt,
  Dorothy Miatt.

Copies of this patent may be obtained for five cents each, by addressing the "Commissioner of Patents, Washington, D. C."